United States Patent [19]

Sachse

[11] 4,308,308
[45] Dec. 29, 1981

[54] MULTILAYER ANTI-DRUMMING AND STIFFENING SHEETING

[75] Inventor: Erhard Sachse, Heppenheim-Kirschhausen, Fed. Rep. of Germany

[73] Assignee: Chemie Werk Weinsheim GmbH, Worms, Fed. Rep. of Germany

[21] Appl. No.: 119,842

[22] Filed: Feb. 8, 1980

[30] Foreign Application Priority Data

Feb. 8, 1979 [DE] Fed. Rep. of Germany ....... 2904688

[51] Int. Cl.³ .................... C04B 43/10; C04B 43/12; E04B 1/82; E04B 1/84
[52] U.S. Cl. .................... 428/168; 181/290; 181/294; 428/168; 428/240; 428/241; 428/246; 428/251; 428/261; 428/271; 428/272; 428/278; 428/283; 428/284; 428/286; 428/290; 428/324; 428/330; 428/331; 428/347; 428/354; 428/489; 428/490
[58] Field of Search ............... 181/290, 294; 428/168, 428/240, 241, 246, 251, 261, 271, 272, 278, 283, 324, 330, 331, 489, 490, 284, 286, 290, 347, 354

[56] References Cited

U.S. PATENT DOCUMENTS 3,276,928 10/1966 Pearson et al. ...................... 181/294
4,056,161 11/1977 Allen ................................. 181/290

Primary Examiner—James C. Cannon
Attorney, Agent, or Firm—Staas & Halsey

[57] ABSTRACT

A multilayer sheeting for attachment to sheet metal to stiffen the sheet metal and diminish noise. An anti-drumming sheeting consisting of a filler embedded in a mass such as a bituminous material may be bonded to sheet metal, such as the sheet metal employed in manufacture of an automobile door, and a stiffening sheeting which may consist of a matrix such as a fiberglass mat drenched in a thermosetting resin is bonded to the anti-drumming sheeting. Such a multilayer anti-drumming and stiffening sheeting is flexible enough during application to conform to the configuration of the sheet metal, but hardens into a rigid lining component when the sheet metal is heat treated during the normal course of fabrication.

12 Claims, 1 Drawing Figure

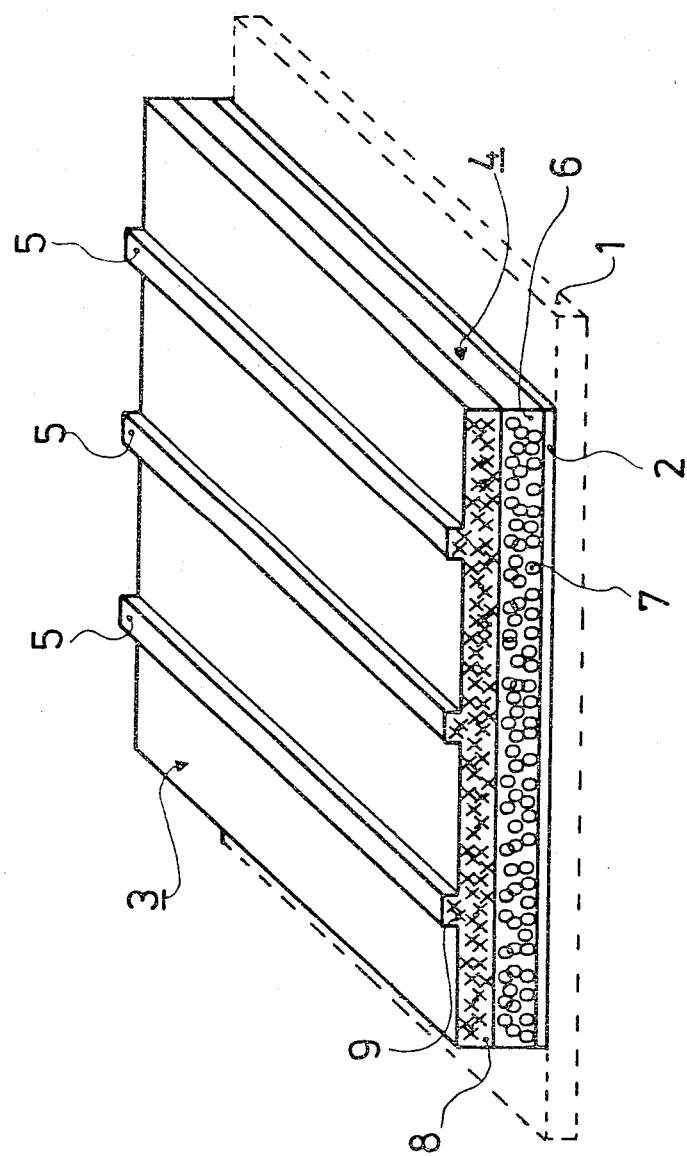

MULTILAYER ANTI-DRUMMING AND STIFFENING SHEETING

BACKGROUND OF THE INVENTION

The subject of the present invention is a multilayer anti-drumming and stiffening sheeting, characterized in that it comprises a previously known anti-drumming layer integrally connected with a stiffening layer made from a matrix drenched with a thermosetting plastic.

The multilayer anti-drumming and stiffening sheeting serves in particular to simultaneously deaden and stiffen slightly curved, or flat metal sheets.

In many fields of technology, e.g., in automotive engineering or when fabricating household utensils, thin-walled metal sheets are employed which are caused to vibrate and, thereby, to radiate sound due to moving parts, e.g., running engines. To control and reduce this sound radiation, said metal sheets have heretofore been provided with anti-drumming linings, which dampen the vibrations and thereby reduce the sound.

These previously known anti-drumming linings consist of filled and unfilled bituminous materials or filled or unfilled plastic materials comprising the following plastics mentioned by way of example: polymethacrylic acid esters, polyvinyl chloride, polyisobutylene, nitrile rubber, polyester, natural rubber, polyvinyl acetate, polystyrene, and polymethylmethacrylate.

The following fillers are also mentioned by way of example: limestone flour, mica, asbestos, and slate flour.

The use of these anti-drumming linings reduces the sound radiated by the metal sheets into the ambient air. Apart from these vibrations, slightly curved metal sheets are also subject to sudden "snapping" sounds. Such snapping sounds may be produced when slightly curved surfaces are loaded with a force from the convex side so that the sheet, when a given force is exceeded, curves inwardly under impact stress with a loud cranking sound while passing through an unsteady intermediate position.

Removal of this force generally causes the curved surface to spring back spontaneously to its initial position with a corresponding cracking sound. In industry, e.g., in automotive engineering, the occurrence of this snapping effect is generally avoided by appropriate treatment of the metal sheet. For example, the sheet metal may be formed or corrugated. Another way of avoiding the snapping effect is to provide stiffening ridges.

SUMMARY OF THE INVENTION

For technical reasons, the above approaches are not always desirable. Very frequently, for example, the needed space is lacking or the appearance suffers.

Therefore, the general object of the present invention is to provide a type of anti-drumming sheeting which dampens sound in sheet metal, as well as avoiding the snapping effect described above. A further object of the present invention is to provide an anti-drumming sheeting which, after insertion, is sufficiently soft that it readily conforms to curves in sheet metal but which, after going through a specified fabrication process, results in a finished product so rigid that the snapping effect is avoided.

As is known, car-body sheet metal, such as the sheet metal in car doors, is subjected to heat treatment during the course of automobile production, say while being painted. Owing to said heat treatment, the initially soft sheeting component made from the multilayer anti-drumming and stiffening sheeting of the present invention is converted into a rigid lining component. This is accomplished by providing such a multilayer anti-drumming and stiffening sheeting which is composed of a previously known anti-drumming layer as described above and a second layer integrally connected therewith, and which is capable of converting its initial softness into a permanent stiffness by being subjected to a heat treatment. As an example, both layers of lining sheeting are bonded together or fused to one another and are built up from a pre-known anti-drumming sheeting as described above and a matrix drenched with a thermosetting resin. This matrix preferably consists of a mat, particularly a glass fiber mat, a felt, or a matting, and is drenched with a thermosetting resin, i.e., with a duroplastic, e.g., a melamine resin or a urea formaldehyde resin. The multilayer anti-drumming and stiffening sheeting of the present invention is either bonded to the metal sheet to be treated or fused or otherwise deposited thereon in a previously known manner.

According to a further embodiment, the multilayer anti-drumming and stiffening sheeting of the present invention may be further stiffened by a stamped pattern of braces on the surface of one of the sheets.

The drenching of the matrix, particularly of a mat-like matrix, preferably occurs through the use of aqueous dispersions which are dried prior to further treatment, so that only one process step for the layer is required.

BRIEF DESCRIPTION OF THE DRAWING

The FIGURE is a perspective view illustrating in crosssection a section of the multilayer anti-drumming and stiffening sheeting of the present invention bonded to a corresponding section of sheet metal.

DESCRIPTION OF THE PREFERRED EMBODIMENT

Reference numeral 1 in the drawing denotes the metal sheet to be deadened and stiffened. The multilayer anti-drumming and stiffening sheeting of the invention is applied to said sheet 1. An illustrative embodiment is shown, wherein anti-drumming sheeting 4 is connected with sheet 1 by means of adhesive layer 2. However, it is also possible to fuse stiffening sheeting 3, instead of anti-drumming sheeting 4, directly on sheet 1 or by means of adhesive layer 2. In the drawing, stiffening sheeting 3 is fused in one piece on anti-drumming sheeting 4. The stiffness of stiffening sheeting 3 may be further increased by surface braces 5, shown in the drawing as ridges. Other bracing patterns may, of course, by employed. Anti-drumming sheeting 4 may consist of filler 7 and mass 6; a bituminous material 6 is particularly appropriate as mass 6. Stiffening sheeting 3 is preferably formed from matrix 9 drenched with resin 8, which hardens when heated. Thus, the drawing shows a three-layer anti-drumming and stiffening sheeting built up from the following three layers: adhesive layer 2, anti-drumming sheeting 4 and stiffening sheeting 3.

Another possibility is to dispense with adhesive layer 2, so that anti-drumming sheeting 4 bears directly against metal sheet 1.

Thus, the advantages of the multilayer anti-drumming and stiffening sheeting of the present invention reside in the possibility of simultaneously stiffening and deadening metal sheets without having to crease them or otherwise specially configure the metal. The multilayer anti-drumming and stiffening sheeting of the present invention conforms to the curves of the metal sheet and becomes independently rigid during the heat treatment when the sheets are being painted. Thus, the sheeting of the invention can be introduced into the normal automobile production without further steps.

I claim:

1. A multilayer anti-drumming and stiffening sheeting for use with a sheet metal element which has a predetermined configuration and which is heated during fabrication of an article, the multilayer anti-drumming and stiffening sheeting comprising: an anti-drumming sheeting which includes a mass and a filler, and a stiffening sheeting which includes a thermosetting material adapted to conform to the predetermined configuration after heating, the stiffening sheeting being integrally connected to the anti-drumming sheeting.

2. The multilayer anti-drumming and stiffening sheeting of claim 1, wherein the stiffening sheeting comprises a matrix drenched with a resin.

3. The multilayer anti-drumming and stiffening sheeting of claim 2, wherein the mass comprises at least one of the group consisting of bitumen and plastic, and the filler comprises at least one of the group consisting of limestone flour, mica, asbestos, and slate flour.

4. The multilayer anti-drumming and stiffening sheeting according to claim 3, wherein the matrix is drenched with the resin in an aqueous dispersion and the flexural stiffening sheeting thus formed is dried.

5. The multilayer anti-drumming and stiffening sheeting according to claim 4, wherein the resin becomes rigid when heated.

6. The multilayer anti-drumming and stiffening sheeting according to one of claim 5, wherein the matrix of the stiffening sheeting comprises at least one of the group consisting of cardboard, felt, glass fiber mat, glass fabric, a mat of mineral fiber waste, and mineral fiber fabric.

7. The multilayer anti-drumming and stiffening sheeting according to claim 6, wherein the anti-drumming sheeting is integrally bonded with the stiffening sheeting.

8. The multilayer anti-drumming and stiffening sheeting according to claim 7, wherein the stiffening sheeting is fused with the anti-drumming sheeting.

9. The multilayer anti-drumming and stiffening sheeting according to claim 8, wherein the stiffening sheeting is provided with braces on the surface thereof.

10. The multilayer anti-drumming and stiffening sheeting according to claim 9, further comprising an adhesive layer on the side of the anti-drumming sheeting which is not integrally connected with the stiffening sheeting.

11. The multilayer anti-drumming and stiffening sheeting according to claim 8, further comprising an adhesive layer on the side of the stiffening sheet which is not integrally connected to the anti-drumming sheeting.

12. The multilayer anti-drumming and stiffening sheeting according to claims 10 or 11, wherein the adhesive layer consists of a hot-melt bonding agent which adheres to sheet metal.

* * * * *

UNITED STATES PATENT AND TRADEMARK OFFICE
CERTIFICATE OF CORRECTION

PATENT NO. : 4,308,308

DATED : December 29, 1981

INVENTOR(S) : Erhard Sachse

It is certified that error appears in the above—identified patent and that said Letters Patent is hereby corrected as shown below:

On the title page

(73) Assignee, line 2, after "Worms" insert -- /Rhein --.

(56) References Cited, line 4, after "Allen" insert
-- , Jr. --.

Column 2, line 36, "crosssection" should read -- cross-section--

Signed and Sealed this

Sixth Day of July 1982

[SEAL]

Attest:

GERALD J. MOSSINGHOFF

*Attesting Officer*  *Commissioner of Patents and Trademarks*